Jan. 7, 1969 R. A. QUOSIG ET AL 3,421,150

MULTIPROCESSOR INTERRUPT DIRECTORY

Filed Aug. 26, 1966 Sheet 1 of 8

INVENTORS
NORMAN L. VISS
RALPH A. QUOSIG
BY Charles A. Johnson
ATTORNEY

INTERRUPTABILITY INDEX CODES (II)

| C | B | A | |
|---|---|---|---|
| 0 | 0 | $0_2$ | = PROCESSOR IDLE |
| 0 | 0 | $1_2$ | |
| 0 | 1 | $0_2$ | |
| 1 | 0 | $0_2$ | = NOT INTERRUPTABLE |

INTERRUPT PRIORITY CODES (IP)

| F | E | D | |
|---|---|---|---|
| 0 | 0 | $0_2$ | = MINIMUM PRIORITY |
| 0 | 0 | $1_2$ | |
| 0 | 1 | $0_2$ | |
| 1 | 0 | $0_2$ | = MAXIMUM PRIORITY |

| TIMING | PS | T-REG. | P-REG. |
|---|---|---|---|
| INITIALIZE | — | 1 1 1 | 0 0 0 |
| TEST 1 II1 = 100 | 1 | 1 0 0 | 0 0 1 |
| TEST 2 II2 = 001 | 1 | 0 0 1 | 0 1 0 |
| TEST n IIn = 010 | 0 | 0 0 1 | 0 1 0 |
| $T_n + 1$ | SELECT PROCESSOR 2 BY GATING $IP_i$ & I/O CODE TO PROCESSOR 2 | | |

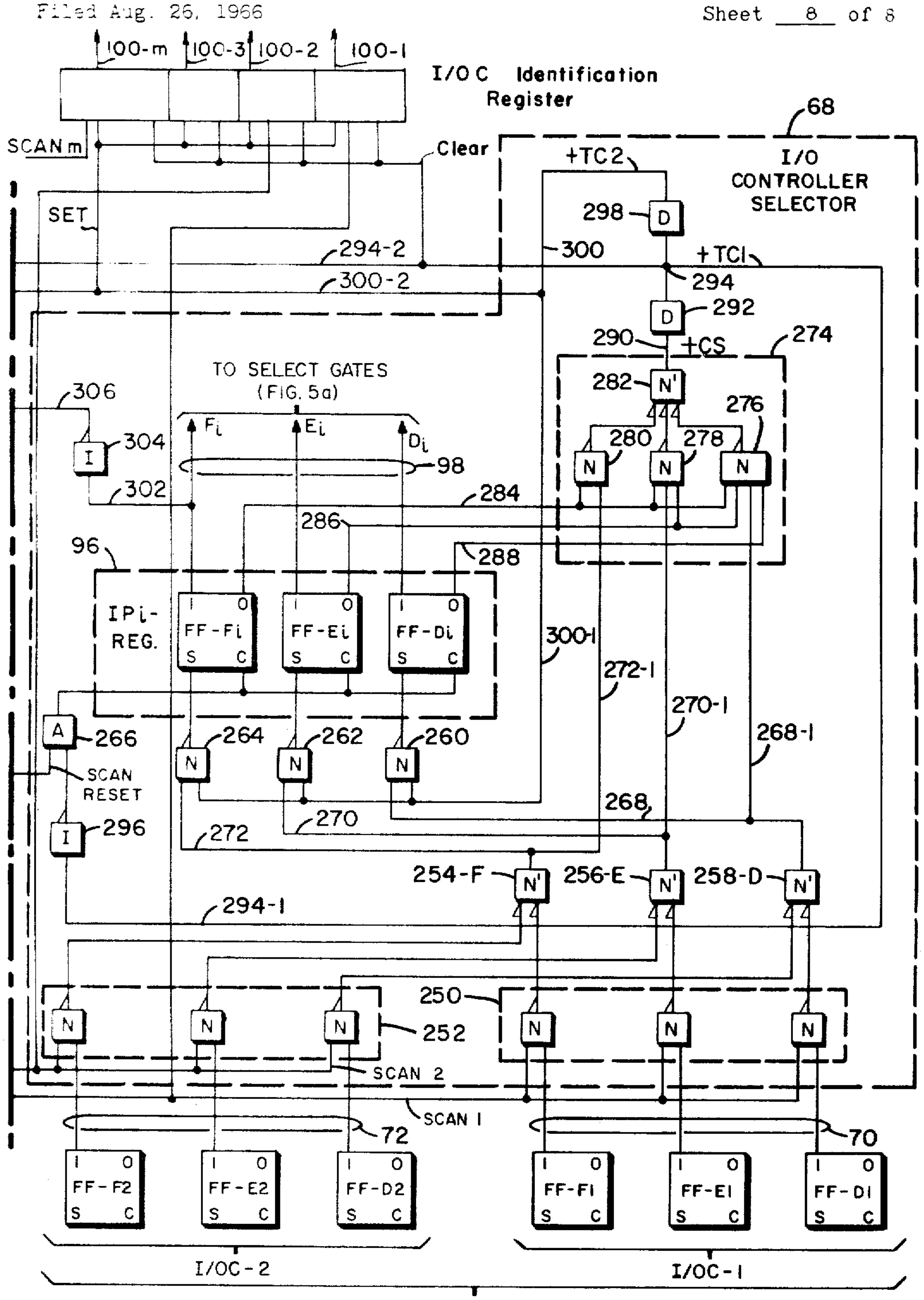
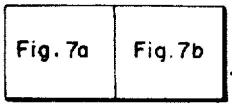
Fig. 7c
Fig. 7b

United States Patent Office 3,421,150
Patented Jan. 7, 1969

3,421,150

MULTIPROCESSOR INTERRUPT DIRECTORY

Ralph A. Quosig, St. Paul, and Norman L. Viss, Savage, Minn., assignors to Sperry Rand Corporation, New York, N.Y., a corporation of Delaware Filed Aug. 26, 1966, Ser. No. 575,345
U.S. Cl. 340—172.5 17 Claims
Int. Cl. G11b 13/00

ABSTRACT OF THE DISCLOSURE

An interrupt directory circuit arrangement in a multiprocessor system for assigning priority-ordered tasks to be performed in the system to the most readily available processor is described. Circuitry for selecting the highest priority task, and circuitry for selecting the most interruptible processor are illustrated. The processors in the system include circuitry for accepting or rejecting the task assignment made by the interrupt directory circuitry.

Figure 1:
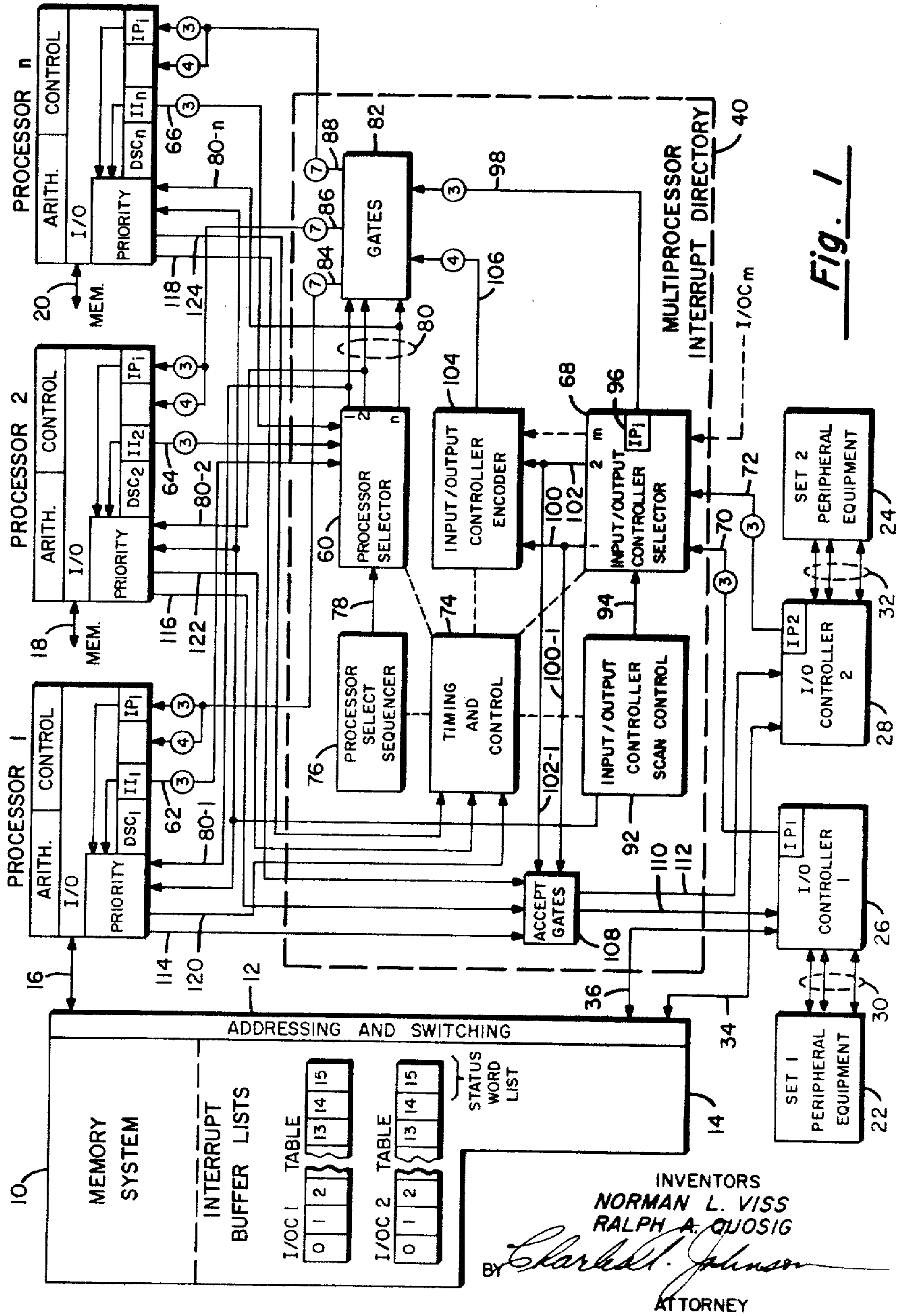

This invention relates to data processing systems, and more particularly, it relates to a system for selectively matching an external interrupt condition to an available processor in a multiprocessor system.

A processor can be defined as a machine which is capable of performing a series of operations as directed by instructions. One class of processors are data processors, each of which generally have an arithmetic section for performing arithmetic and logical data-manipulations, input/output circuitry for transmitting data and/or instructions to and from the processor, a control section for timing the internal operations and controlling the instruction executions, and in some instances a storage section for at least temporarily storing data words and/or instructions words.

A multiprocessor system can be considered to be a computing system configuration comprised of more than one independently initiatable processor, each of which has access to a common, jointly-addressable memory system. The multiprocessor concept of system organization has become an important tool both in tailoring new computer systems to newly emergent applications and in raising the overall achievable efficiency of the hardware and so-called software. The individual processors are the main decision makers in the multiprocessor system. Each processor accesses the instructions stored in the central memory system and sequences them for execution. The instruction control portion of the control section decodes command words read from the common memory and provides command signals directing the operation to be performed. The processor utilizes its internal index memory to modify the operand addresses in the instructions and then requests data words from the common memory system through the data access control portion of the control section. The data words are retrieved and sent to the arithmetic section of the processor where they are used in carrying out the instructions involving arithmetic operations. Other instructions cause the contents of the processors arithmetic section to be stored in the common memory section. The processors are normally internally synchronous, but operate asynchronously with regard to each other in the multiprocessor system. The overall system control, rather than being based on synchronous timing, is based on demand-requests and current-accessibility. Such a system operation permits the arithmetic operations being performed in the respective processors to proceed simultaneously, with each processor gaining access to the common memory as needed, such access qualified only by the accessibility of the memory at the time of demand. Input/output operations are normally through the common memory system rather than direct from the processor to the peripheral equipment.

In a multiprocessor system configuration, there are normally a plurality of tasks to be performed. A task can be considered to be a sequence of processor instructions, at least portions of which may be executed by a processor concurrently with the execution of other tasks by other processors. The necessity of performing a task may be determined as the result of an internal processor computation, as a result of a processor terminating a task and selecting the next ordered task to be performed, as the result of a timing consideration, or as the result of an external interrupt condition being detected. It is to the latter condition that this invention is primarily directed. An interruption is that sequence of events in the processor which occurs when the current instruction sequence (task) is automatically suspended and a new instruction sequence is initiated and processed. The processor is in the state of interruption with regard to the current task execution from the time of its suspension to the time when either the processor has returned to the same point at which activity was suspended or until it returns to a new instruction sequence as determined during the processing of the interrupt. An interrupt is a signal which causes an interruption.

In a multiprocessor system configuration it is not desirable to have a central-so-called master processor for directing task execution, because it results in inefficient utilization of processor time. Instead, each processor selects for performance, according to predetermined criterion, the tasks to be performed. These tasks will have predetermined degrees of urgency for performance, and result in changing degrees of interruptibility for each processor as the task execution changes. At any given time, other processors and peripheral equipment in the system will not be advised as to the degree of urgency (interruptibility factor) of a particular processor task being executed. Similarly, interrupt conditions will have varying degrees of urgency ranging from conditions which require immediate processing to conditions which may be delayed for an indefinite period of time. When arranged according to urgency, an interrupt priority arrangement would result. It is, accordingly, a primary objective of this invention to provide means for matching a high priority interrupt condition to a processor in a multiprocessor configuration which is executing a task that has the highest degree of interruptibility. A major concern of this invention, then, is the solution of the problem of selecting a processor in a multiprocessor configuration so as to Interruption of a unit computer, that is, a data processing device having a control section, an arithmetic section, an input/output section, and its internal memory section, is well known. Priority of interrupts in such a system is also well known. A characteristic approach to the handling of priority of interrupts for unit computers is to assign by numbered input/output channel, the priority according to an associated input/output channel. Such systems often utilize the numerical designation of the input/output channel to indicate an order of priority. For instance, in a 16 channel system an interrupt signal on channel 12 would have a higher priority than an interrupt signal on channel 5, and would be selected ahead of channel 5 for processing. Such unit computer approaches do not take into account the task being performed by the unit computer at any given time nor do they take into account possible varying conditions in the overall system, wherein due to sequencing, a device coupled to a lower ordered numbered input/output channel may actually require servicing ahead of a device coupled to a higher numbered channel. In other words, there is lack of versatility in such a fixed priority interrupt system. Such systems do not lend themselves to dynamic changes of the respective priorities to be accorded interrupting equipments, nor do they provide for a variable level of interruptibility of the computer itself as determined by the then operating task execution program. To overcome these problems, varying techniques have been utilized. A prevalent solution is to utilize an executive program for directing the completion of interrupted programs and for selecting relative priorities of their execution. Such executive programs along with the necessary so-called housekeeping operations required for storing and resetting operational registers, results in a substantial overhead time expenditure in the handling and processing of interrupts.

The subject invention is directed at minimizing many of these problems. In order to optimize the handling of interrupt conditions, each processor operates to establish an interruptibility level for the task currently being performed. This interruptibility level is made available to the remainder of the multiprocessor system by having a coded control word called the interruptibility index (II) stored in a register which is accessible to the remainder of the multiprocessor system. As task execution is changed within the processor, the interruptibility index code is altered accordingly. The interruptibility index code provides a continually up-dated indication as to the state of the processor. An evaluation of the interruptibility index for each of the processors in the multiprocessor system will provide an indication as to which processor is the "most interruptible" at any given time. The degree of interruptibility can range all the way from an idle processor which is totally interruptible, to a processor operating in a mode which is completely uninterruptible or locked out of the interrupt system. In a similar manner, each interrupting entity can have a variable urgency accorded to it. This establishes the level of interrupt priority and is subject to adjustment depending upon the nature of the interrupting entity. The interrupt priority (IP) is established by the interrupting entity as a coded word made available to the remainder of the system, and can be established in a range that will cause interruption only when the system is relatively inactive, to the situation where an interrupt will cause all but locked out processors to be considered for interruption. The manner in which the interruptibility index codes and the interrupt priority codes are formed does not form a part of this invention, and will not be described in detail.

Taking the input quantities described above, namely the interruptibility index values for each of the processors, and the interrupt priorities for all interrupting entities, it is the function of the subject invention to select the lowest interruptibility index code (the processor that is most susceptible to interruption) and match it to the highest interrupt priority code received from the interrupting entities. Stated another way, it is the function of the subject invention to match the highest priority interrupting entity to the most available processor. Once this match has been accomplished, the appropriately identified processor is notified that an interrupt condition is desired. The processor so identified operates to compare its interruptibility index against the interrupt priority code received. When the processor determines that its interruptibility index code is less than the interrupt priority code, it will accept the interrupt condition. In the event that the processor's interruptibility index is found to be equal to or greater than the interrupt priority code, the processor rejects the interrupt condition. It is accordingly, another object of this invention to provide apparatus which will select a processor which is most susceptible to interruption and match it to the interrupt entity which bears the highest interrupt priority. Another objective is to provide a system in which the processor selected for interruption can refuse to be interrupted according to the status of the task then being performed.

*Conventions employed*

Throughout the following description and in the accompanying drawings there are conventions employed that are familiar to those skilled in the art. Additional information concerning these conventions is set forth hereinbelow. In the block diagram figures, a conventional full arrowhead is employed on lines throughout the drawings to indicate (1) a circuit connection, or (2) the direction of pulse travel which is also the direction of control. A logical 1 signal for this embodiment is a high signal or (+) and is approximately ground potential. For this embodiment a logical 0 signal is a low signal approximately −4.5 volts, designated (−). Cables which are used to transfer data are shown as lines with an arrowhead at one end thereof indicating the direction of data signal flow, and at some point intermediate the end of those, the lines are widened in the form of a circle. The number appearing within the circle indicates the number of conductors encompassed by the cable.

Bold face character symbols appearing within a logic block diagram symbol identify the common name for the circuit represented; that is, a common bistable flip-flop is identified by an FF, an inverter circuit is designated I, a delay circuit is designated D, a logical AND circuit is identified by A, and the logical OR circuit is identified as OR, and N and N' represent the logical circuits. In addition to the bold face characters just enumerated, a dash followed by numerical designations will identify the stage of the circuit identified by the bold face character for registers, or the rank of logic.

In the description, the general arrangement of the apparatus will be first described with respect to the manner in which the various circuit components in the apparatus are interconnected and with respect to the general overall operation which is performed by the components. The description of the general arrangement will be followed by separate and more detailed description of the various circuitry and logic to particularly point out the operation of the embodiment of the subject invention. Those elements which are felt to be necessary to be mentioned to set the frame work of the inventive concept will be described in general terms only without detailed consideration.

It is obvious that anyone skilled in the art possesses sufficient knowledge enabling him to construct or purchase commercially available components indicated in the logic block diagrams and referred to in the specification as inverters, AND and OR circuits, delay circuits, and flip-flop circuits. Those components which, per se, are well known in the art are not herein illustrated, nor described in detail, for the sake of simplifying the description of the invention.

*Interrupt directory system considerations*

The system control of the multiprocessor system is based on the concept of a pool of anonymous processors. Such a system may also be called a "free running" system in which any task, the execution of which may be performed in parallel with the performance of other tasks may be executed, or partially executed, by any Processor. The supervisory or executive control is included within this operation. Upon completion of a task, a Processor is free to assign itself a new task. The absence of built in specialization among the processing units is termed "processor equivalence." This does not necessarily mean that each Processor unit is in fact an equivalent of the next, but only means that each Processor must have equal capability of performing any given task. In the equivalent Processor organization of the subject invention, the only functional distinction between the Processors is the contents of their localized memories.

The input/output interrupts which are to be processed by the apparatus of the subject invention, are characterized by occurring independently of the tasks in execution. The occurrence of such interrupt signals has no dependency upon the specific Processor, but is related only to the task associated with controlling the input/output subsystem which generated the interrupt signal. Essentially, an I/O interrupt is a signal to start processing an additional path of instructions. It should be noted, however, that it is not necessary to capture a busy Processor to handle the I/O interrupt unless—

(A) There are not sufficient Processors to work on all the available tasks, and (B) The I/O interrupt path is considered of a higher priority than a task currently being executed.

In a system of the type herein described, optimum priority response is the correct system reaction to a changing task priority "load." In a multiprocessor system having $n$ processors, optimum priority reponse implies that out of $t$ tasks that could be running at a given time, the system is executing the $n$ tasks with highest priorities. If each potential task includes a weighting factor, then the tasks must be selected so that the sum of the weights of the $t$ tasks being run is at a maximum. The sum of the $t$ weighting factors, or priority values, is the total system priority. Part of the job of maximizing total system priority is in the task control routine, which does not form a part of this invention. However, input/output interrupts cannot be included in the normal task control mechanism. This becomes apparent if it is considered that the system reaction to an input/output interrupt request must still be such that if the Processor were to be interrupted, there must be a net gain in the total system priority resulting therefrom. If no gain would result, then no Processor should be interrupted. This extends to the situation that the Processor should not even be interrupted to evaluate a potential gain or loss in total systems priority. As a result, in order to insure optimum priority response when an input/output interrupt occurs, a control mechanism is utilized to predict the effect of the interrupt on the total system priority. Such a control mechanism should operate independently and not require a Processor for its implementation. Furthermore, if the net gain is foreseen, the interruption should be accomplished in such a way as to obtain the largest net gain.

The algorithm for Processor and interrupt selection is implemented in hardware to be described in more detail below, and is referred to as the multiprocessor Interrupt Directory. This circuitry automatically assigns Processors to interrupt related tasks, and selects the external interrupting entity to be processed. The assignment is performed on the basis of Processor status at the time of the interruption. Based on the interruptibility index (II) from each Processor and the interrupt priority (IP) from each Input/Output Controller, the Interrupt Directory performs three basic operations:

(1) It selects the Processor with the lowest interruptibility index code;

(2) It selects the interrupt request having the highest interrupt priority code; and (3) It interrogates the selected Processor if the interrupt priority code is greater than the interruptibilty index of the processor. All input/output interrupt requests are channeled through or are initiated by an Input/Output Controller (I/OC). As each interrupt request is generated, the associated I/OC stores the related interrupt status word in a buffer in the Main Memory. Each I/OC has assigned thereto its own buffer which includes a plurality of lists with each list being associated with a given interrupt priority code level. A status word is generated and stored in the appropriate list according to the interrupt priority code of the requesting interrupting entity, and is stored in the buffer for the related I/OC. This storing always occurs, and should there be several interrupts with the same IP code from the same I/OC, the status word is queued in the list. Each I/OC monitors all interrupt requests from its associated peripheral equipments, and presents to the Interrupt Directory circuitry the highest IP code it finds. The Interrupt Directory in turn monitors all Input/Output Controllers, looking for the highest IP code. As the Interrupt Directory performs the scan, each I/OC is instructed to hold its IP code lines static while being sampled by the Interrupt Directory circuitry. Once the Interrupt Directory circuitry determines the I/OC with the highest submitted IP code, it releases the other I/OC's, but continues it command a lockout to the selected I/OC. If several I/OC's have the same highest IP code, one of these is selected based on its physical connection to the system according to some predetermined ordering scheme. The interruptibility index code for the selected Processor is then compared to the interrupt priority code selected. Because of the asynchronous relationship between Processors and the Interrupt Directory circuitry, the final decision to interrupt the task is made by the selected Processor itself. This follows since the Processor could have changed its interruptibility index code during the brief time interval between Processor selection and the submission of the interrupt request to the Processor. The Processor makes its final decision by comparing the submitted IP code with its own current II code and returns an acceptance or rejection signal to the Interrupt Directory. If an acceptance signal is made, the Interrupt Directory acknowledges the originating I/OC, and only at this time is the statisizing command to the I/OC released. While the I/OC was held static, the statisizing applied only to its output lines to the Interrupt Directory. Internally the I/OC is free to accept additional interrupt request and store the related status words in the appropriate lists in the Main Memory. An I/OC operates to remember which additional request had the highest interrupt priority code in this interim period, and as soon as the acceptance acknowledges are received from the Interrupt Directory circuitry, this request is forwarded to the Interrupt Directory as a candidate of this I/OC for selection during the next selection cycle. In the event the Processor returns a rejection signal as a result of the interrupt attempt, the same sequence of events occurs and the Interrupt Directory merely starts another selection cycle. If the original request still has top interrupt priority, the selection cycle amounts to a search for a different Processor for interruption. It can be seen from the foregoing that there is complete asynchronous versatility in the matching of the interrupt requests with the independently operating Processor units and that total system operation is at all times optimized within the computing capacity of the Processors in this system.

*Drawings*

Figures 2, 3:
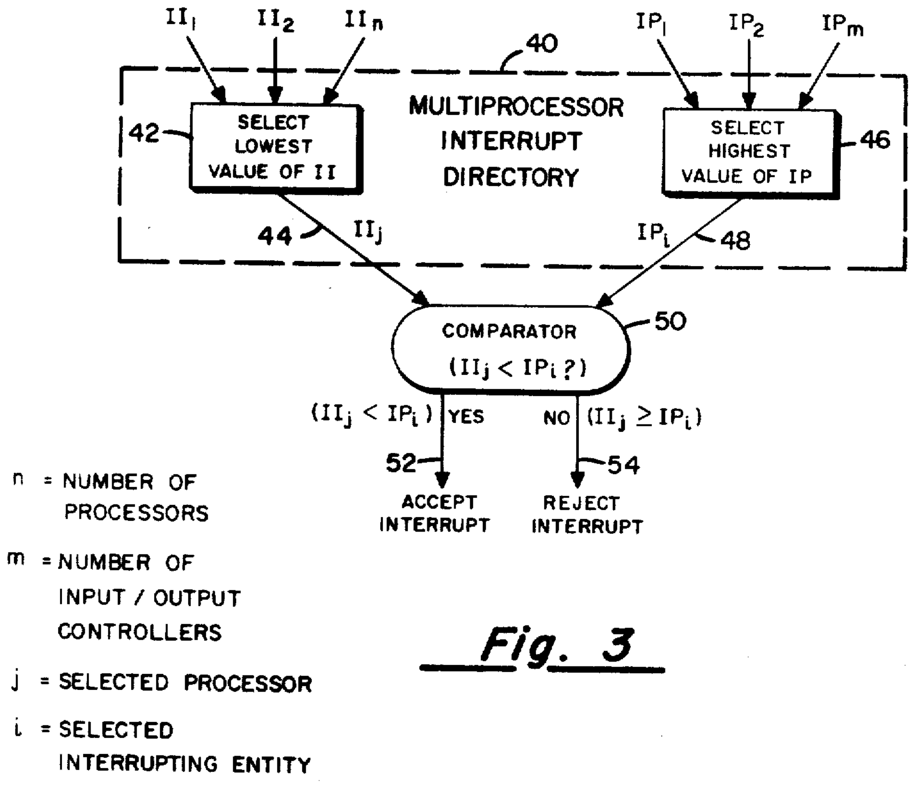
Figure 4A:
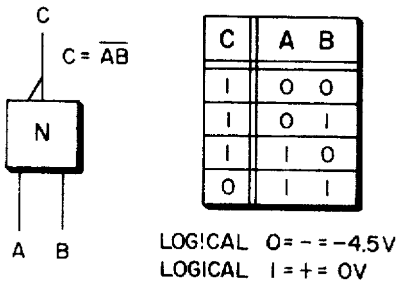
Figure 4B:
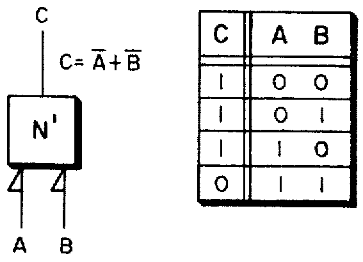
Figure 4C:
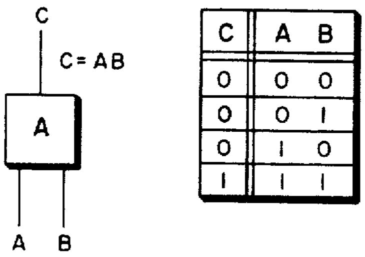
Figure 4D:
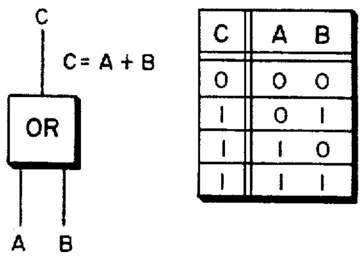
Figure 4E:
Figure 4F:
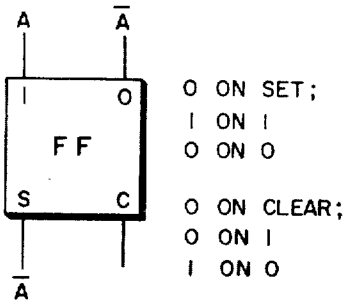
Figure 4G:
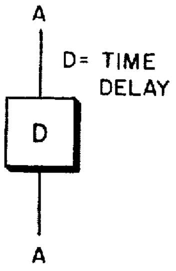
Figure 5A:
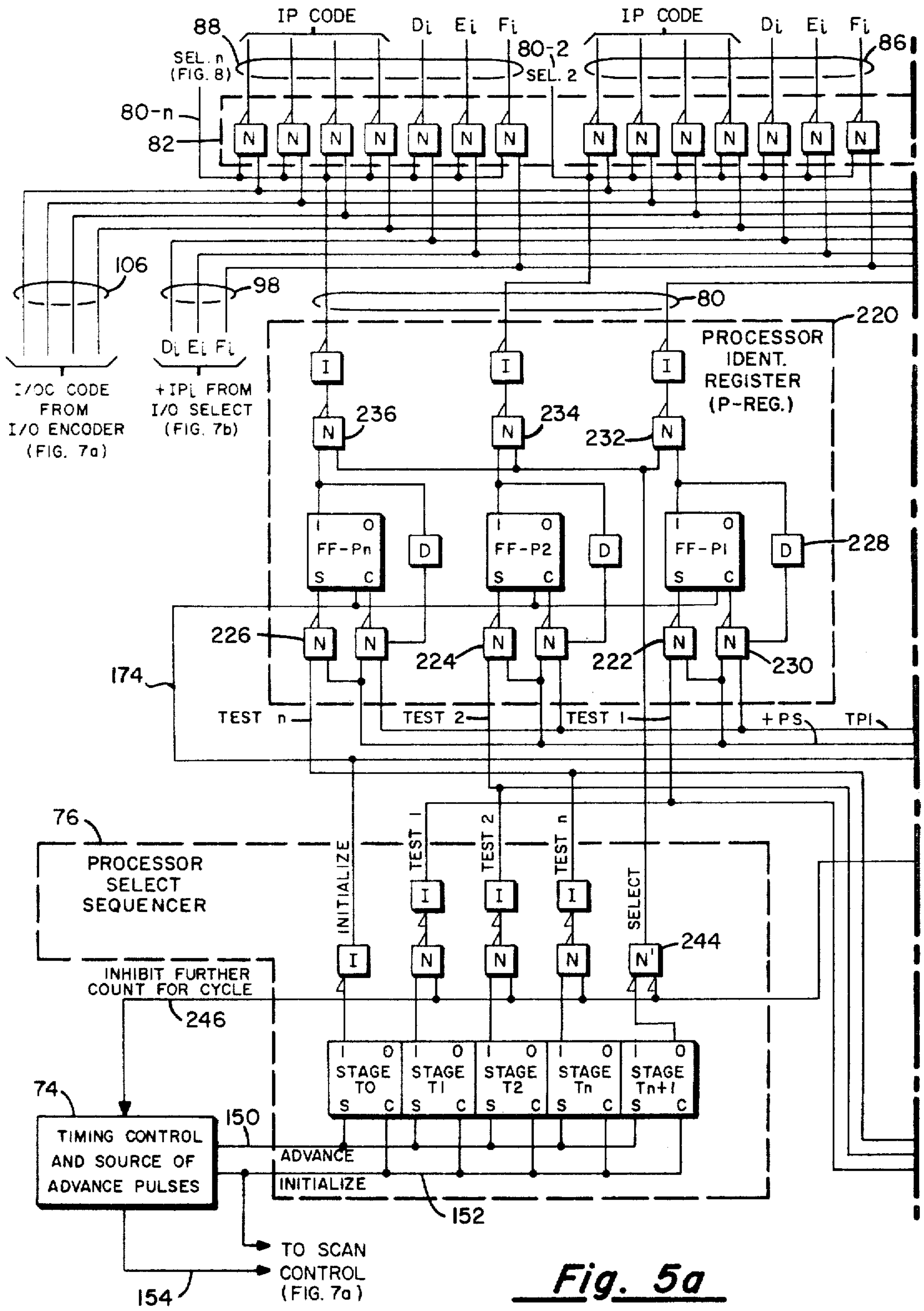
Figures 5B, 5C:
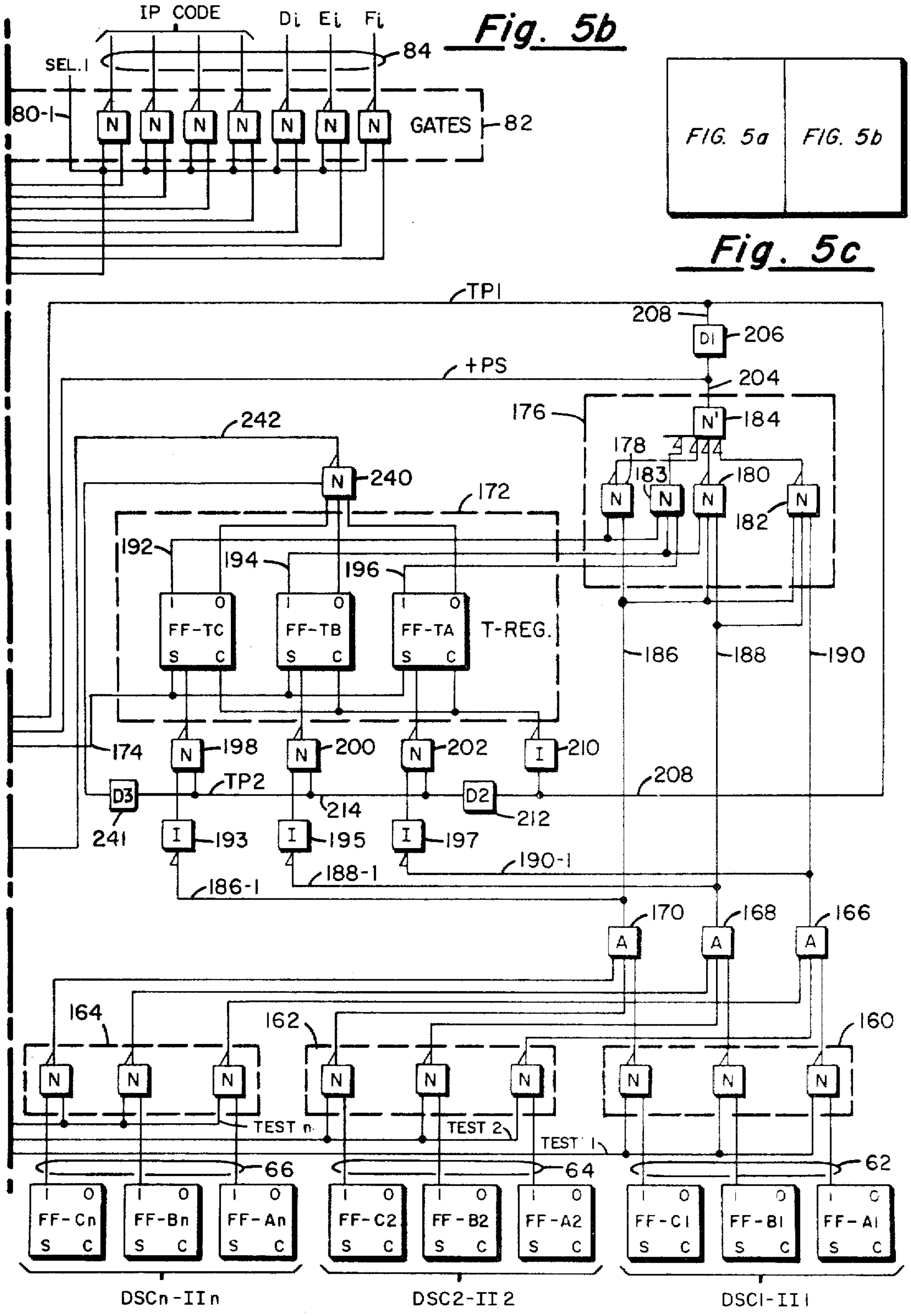
Figures 6, 8:
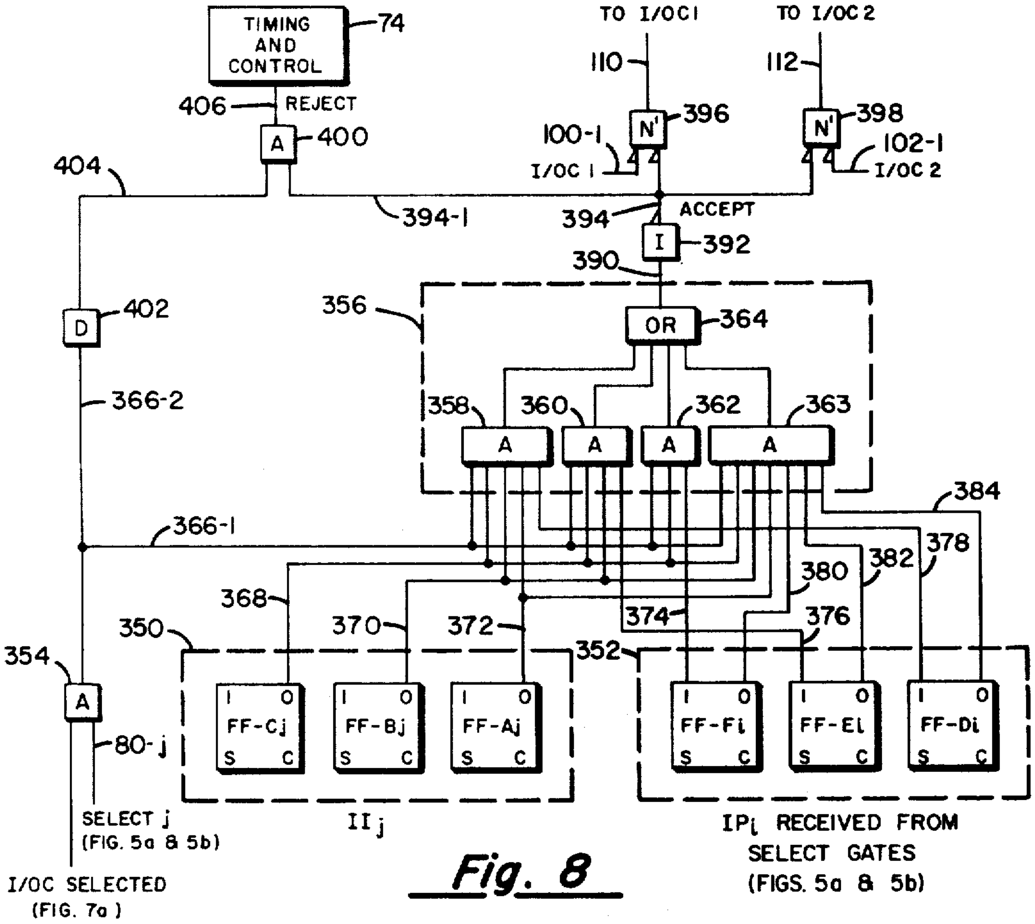
Figure 7A:
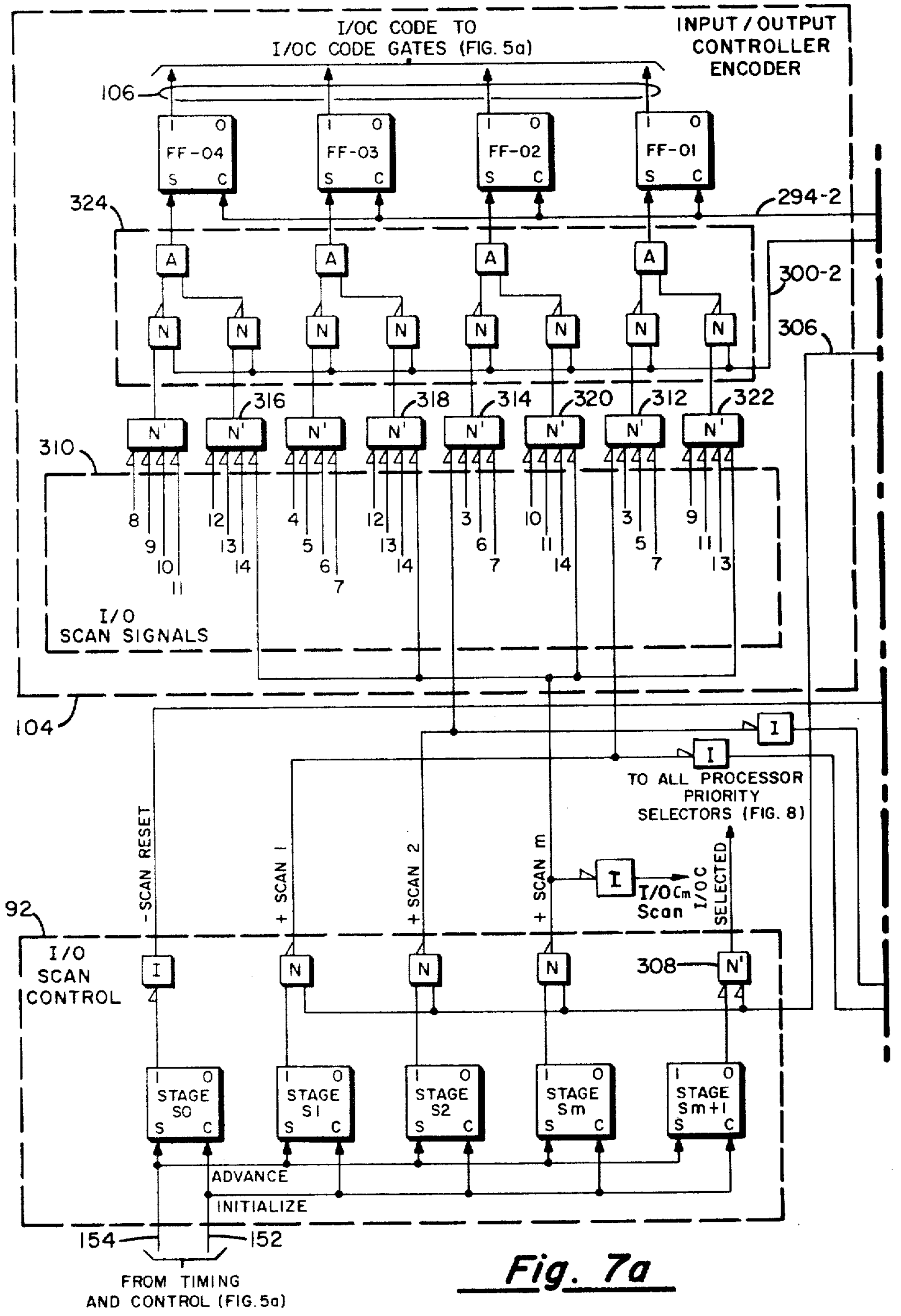

FIGURE 1 is a logic block diagram of the multiprocessor Interrupt Directory system; FIGURE 2 sets forth illustrative interruptibility index code values and interrupt priority code values; FIGURE 3 is a logic block diagram of the comparison of the selected interruptibility index code to the selected interrupt priority code; FIGURE 4*a* through 4*g* illustrate the block diagram symbols for the logic circuits employed in the embodiment of the subject invention; FIGURES 5*a* and 5*b*, when arranged as shown in 5*c*, are a logic diagram of the Processor selection portion of the Interrupt Directory; FIGURE 6 illustrates an example test sequence for the selection of a Processor; FIGURES 7*a* and 7*b*, when arranged as shown in FIGURE 7*c*, are a logic block diagram of the Input/Output Controller selection portion of the Interrupt Directory; and FIGURE 8 is a logic block diagram of the Processor priority network circuitry.

*General description*

FIGURE 1 is a simplified logic block diagram of a multiprocessor system which incorporates the multiprocessor Interrupt Directory of the subject invention. A central part of the multiprocessor system is the modular Memory System 10 which has an Addressing and Switching portion 12 which directs access to the particular addressable memory register desired, and controls the access by the Processors and the Input/Output Controllers when queueing exists. A portion of Memory System 10 is comprised of the Interrupt Buffer List 14 which will be described in more detail below. The precise nature and complexity of the Memory System is not a part of this invention and will not be described in detail, it being understood that various memory system arrangements would be acceptable for use with the subject invention. The memory may be one common module or it may be composed of several modules. In either case, the Memory System is able to communicate with every Processor in the system. Similarly it can communicate with every I/OC in the system. Each memory module responds to read and write data requests from both Processors and Input/Output controllers. Each memory module has the ability to resolve queues which arise from simultaneous Processor and for I/OC unit requests.

In the illustrative embodiment, there are three processors shown labeled Processor 1, Processor 2, and Processor *n*. For the sake of simplicity, they are illustrated as identical Processor units, though in practice they may have different computational capabilities. Each of the Processors has an arithmetic unit (Arith.) for performing arithmetic and logical operations on operands as directed by a program of instructions; a control portion for providing timing to the internal operation of the processor and for performing instruction translation and execution; and an Input/Output (I/O) section for providing communication both to and from the Memory System 10. The communication link of Processor 1 to Memory System 10 is via cable 16. Cable 16 is a multiple conductor cable which operates to transfer data words and instruction words in parallel. Though a single cable is illustrated, the usual construction is to utilize a plurality of conductors arranged in parallel for transmitting data and instruction words from the Processor to the Addressing and Switching portion 12, and a second cable having a like number of conductors for directing data words and instruction words from Memory System 10 to the Processor. Processor 2 has cable 18 and Processor *n* has cable 20, as their respectively designated memory connection cables. These cables are not illustrated coupled to the Addressing and Switching portion 12 for simplicity of the diagram, it being understood that such connection is necessary. Each Processor has a Designator Status Control register (DSC). A portion of the Designator Status Control register is utilized for storing the interruptibility index for the processor. In Processor 1 it is illustrated as the block portion 111; in Processor 2 it is designated as 112 and in Processor *n* it is designated as 11*n*. The function of the Designator Status Control register is to provide a source of indication as to the status of the operation of the Processor. It will be recalled from above, that the operating program, which is performing a designated task, operates to provide an interruptibility index code which indicates the degree of interruptibility of the Processor. The respective interruptibility index codes are available to the Interrupt Directory for evaluation. For the subject embodiment, the interruptibility index codes are comprised of three binary digits and are provided on three parallel conductors. The remainder of the status codes in the Designator Status Control register are not relevant to the operation of the subject invention and will not be described. Of prime importance is the understanding that the interruptibility index codes are subject to change for the respective Processors and will be continually updated depending upon the task being executed at any given time. Another portion of the circuitry utilized for processing interrupts is a register designated as the Input Priority register (IP). The Input Priority register is utilized to store the selected highest priority interrupt code found to exist. The Input Priority register is a three digit storage register. Finally, each processor has Priority circuitry which is utilized to receive in parallel the interruptibility index code and the interrupt priority code for performing an evaluation as to their relative magnitude.

Turning briefly to a consideration of FIGURE 2, which is a chart of the interruptibility index codes utilized for the subject embodiment and of the interrupt priority codes utilized. It will be noted that in both cases, the codes are such that only one of the three possible digit positions are set to logical 1, or may be considered active. This will be referred to as a one-of-three code system. Considering the interruptibility index codes first, it will be noted that code $000_2$ indicates that the Processor is idle, that is, it is not performing any task execution. Accordingly, this interruptibility index code indicates that the Processor having such a code is the most susceptible to an interruption requirement. This obviously follows since the Processor is not performing any task at the time. At the other end of the scale, it will be noted that code $100_2$ indicates that the Processor is not interruptible under any circumstances. This condition may arise for instance if the Processor is inoperative, or if the Processor is executing a task that is so critical to the multiprocessor system that it cannot tolerate interruption at that ime. Falling in between these boundaries, are codes of $001_2$ which is next in line to the idle Processor for its degree of interruptibility, and $010_2$ which is of a corresponding less interruptible state. This range of codes is illustrative only and may of course be expanded or contracted to provide any desired degree of gradation of interruptibility levels.

The interrupt priority codes are also a one-of-three active coding system. At the low end of the priority scale is code $000_2$. Such a code would be attached to an interruption which is not critical in any sense of the word to the operation of the multiprocessor system. It would merely relate to the performance of a task whenever all other tasks have been handled. At the other end of the scale, is code $100_2$ which indicates a maximum priority condition. This code when attached to an interrupting entity indicates that all but noninterruptible Processors are subject to recognizing this priority code. Falling between these limits are interrupt priority codes $001_2$ which is next in degree to the minimum priority code, and $010_2$ which is only slightly lower in priority than the maximum priority condition. Again, the range of codes is illustrative only, and may be expanded or contracted as necessary.

Returning now to a consideration of FIGURE 1, it will be noted that in the multiprocessor system a plurality of peripheral equipments are commonly utilized. Characteristic peripheral equipments are magnetic tape transport units, magnetic drum units, paper-tape reader and punch units, punched card reader and punch equipment, being the data processing portion of the system, and such items as differential analyzers, on line X–Y plotters, process control sensors, on-line machine tool systems, for the portion of the multiprocessor system that is operating in a control capacity. It is of course understood that the foregoing is merely illustrative and is intended only to show the diversity of the types of tasks that the multiprocessor system may be required to handle. For the embodiment illustrated, there are two sets of Peripheral Equipment, labeled 22 and 24. The precise nature of the peripheral equipment is not critical for an understanding of the subject invention, it only being necessary to understand that the various peripheral equipment will require varying degrees of urgency of response when an interrupt is necessary.

Associated with each set of peripheral equipment, is an Input/Output Controller (I/OC). Set 1 of Peripheral Equipment 22 is coupled to Input/Output Controller 1, labeled 26, and Set 2 of Peripheral Equipment 24 is coupled to Input/Output Controller 2, labeled 28. A set of cables is provided for each Peripheral Equipment in coupling to its associated Input/Output Controller. For instance, each tape transport has a cable for conducting signals from the I/OC to the tape transport and a cable for transporting characters from the tape transport to the I/OC. The cables between Peripheral Equipment 22 and I/OC 26 are shown collectively as cable grouping 30, and the cables between Peripheral Equipment 24 and I/OC 28 are shown collectively as cables 32. Only two I/OC units are illustrated, but it should be understood that this may be expanded within the circuit limits of the multiprocessor system to $m$ I/OC units. The function of the Input/Output Controller is to provide control to its associated Peripheral Equipment by directing control words to the Peripheral Equipment. The Input/Output Controller also operates to match the format of the data signals provided from the Memory System 10 to the format utilized by the particular piece of peripheral equipment. Each Input/Output Controller 26, 28 is coupled via cables 34 and 36 respectively to the Addressing and Switching portion 12 of Memory System 10. Each Input/Output Controller has an Interrupt Priority register designated IP1 and IP2 for I/OC 26 and 28 respectively, and are comprised of three bistable stages utilized for storing the highest interrupt priority for the Peripheral Equipment associated therewith. Control circuitry internal to the respective I/OC operate to evaluate their respectively associated Peripheral Equipment and to establish a code, as defined above, which defines the highest interrupt priority for interrupting entities then required by the associated Peripheral Equipment. Though the Processors initiate Input/Output operations, the control and means for sustaining the various operations is handled by the I/OC. Each I/OC may supervise several input/output operations concurrently for instance one for each channel to external subsystems. Each I/OC receives all interrupt signals from the external subsystems associated with it.

Shown enclosed in dashed block 40 is the multiprocessor Interrupt Directory circuitry. Turning briefly to a consideration of FIGURE 3, which is a block diagram of the major functional components of the system, in which a Processor is matched to an interrupt condition; and the Processor determines whether or not it will accept the interrupt. The system insludes the circuitry for receiving a plurality of interruptibility index codes designated II1, II2, and II$n$, each of the interruptibility index codes comprised of signal groupings, for instance as described in FIGURE 2, respectively indicative of the degree of interruptibility of a respectively associated processor; and Processor Selection Means 42 which operates on the received interruptibility index codes for selecting the lowest interruptibility index value during a given scan cycle for providing the selected interruptibility index II$j$ on cable 44. Simultaneously, a plurality of interrupt priority codes designated IP1, IP2 and IP$m$, each of the interrupt priority codes comprised of signal groupings respectively indicative of the degree of interrupt priority of an associated interrupting entity, are received by means for selecting the highest priority interrupting entity 46. A cable connection 48 is included for providing the selected interrupt priority IP$i$ as selected. (See interrupt priority codes from FIGURE 2.) The multiprocessor Interrupt Directory 40 operates to advise the particular Processor selected that it should perform the comparison of its interruptibility index (II$j$) to the determined interrupt priority code IP$i$. This operation is indicated by Comparator 50. When it is determined that the interruptibility index code selected II$j$ has a magnitude less than the interrupt priority code selection IP$i$, a signal is provided on conductor 52 which indicates that the interrupt condition will be accepted by the Processor. In those instances where the interruptibility index II$j$ is equal to or greater than the interrupt priority code selected IP$i$, the processor will issue a signal on conductor 54 which will advise the system that it is rejecting the interrupt since the task being performed is more important than the interrupt condition requested to be processed. It should be noted that the Comparator is shown associated with each Processor, with the "accept" or "reject" lines intercoupling the Processors and the Interrupt Directory. Another system would be to have a single comparison circuit included in the Interrupt Directory, with processor-select lines directed to the Processors. The latter system of course results in lower system effectiveness, and may result in slower response.

The foregoing is the general system configuration and will be described in more detail below, both with regard to FIGURE 1 which is the overall system configuration and circuit detail to follow. A Processor Selector 60 is coupled to the II register portion of the Designator Status Control register of each of the Processors. The coupling is via three-conductor cables 62, 64, and 66 for Processors 1, 2, and $n$, respectively. An Input/Output Controller Selector 68 is coupled to each of the Input/Output Controllers via three-conductor cables. For this embodiment, I/OC 26 is coupled to Input/Output Controller Selector 68 via cable 70 and I/OC 28 is coupled to the Selector 68 via cable 72. The Timing and Control Circuitry 74 operates to provide sequencing control and gating for all circuitry in the multiprocessor Interrupt Directory 40, and will be described in more detail below. A Processor Select Sequencer 76 is initiated, and operates via control cable 78 to sequence the Processor Selector 60 to the evaluation of the interruptibility index codes. It is the function of the Processor Selector 60 to evaluate each of the interruptibility index codes and to select the lowest numerical value. Having selected the lowest numerical value, a signal is provided on one of conductor group 80. The conductor in grouping 80 which carries an active signal is indicative of the Processor selected, and only one such conductor will carry an active signal. Of course other coding systems come readily to mind, and it is not intended to limit the scope of the invention to the coding system shown. The signal provided on one of conductors 80 is utilized to activate an associated grouping in the set of Gates 82. For this embodiment, a set of 7 gates for each Processor in the system is provided. The seven gate arrangement for each of the Processors is activated by its respectively associated signal received from the Processor Selector 60. The output signals from the Gates 82 are directed to 7-conductor cables 84, 86, and 88 which in turn are directed to Processors 1, 2 and $n$ respectively. When a processor-select sequence has been completed, and the Processor having the lowest interruptibility index code has been selected, a signal is provided by the Processor Selector 60 on one of conductors 80–1, 80–2, or 80–$n$, and is directed to the priority circuit of the selected Processor in the system. Simultaneous with the scanning of the processor interruptibility index codes, an Input/Output Controller Scan Control 92 operates to sequence the Input/Output Controller Selector 68 via control line 94. Selector 68 operates to compare the interrupt priority codes (II) received from the respective Input/Output Controllers and to select the highest priority code. The highest priority code is then stored in the IP$i$ register 96 from whence it is directed over a three-conductor cable 98 to Gates 82. The Input/Output Controller Selector 68 also provides an active signal on one of conductors 100 or 102 for this embodiment. It will be noted that for $m$ Input/Output Controllers, there will be $m$ conductors in this class. The active signal on conductors 100 or 102 are directed to Input/Output Controller Encoder 104 where the single signal is converted into a four digit code indicative of the I/OC and is provided on four-conductor cable 106 as an input to Gate 82. The four-digit code from the Input/Output Controller Encoder 104, and the three-digit input priority code (IP$i$) from register 96 form the seven digit word that is transmitted to the selected Processor via enabled cable 84, 86, or 88. The Input/Output Controller Selector 68 provides a signal on either conductors 100–1 or 102–1 to activate the appropriate Accept Gate 108. An Accept Gate is associated with each of the Input/Output Controllers 26, 28 and provides a signal to the selected I/OC via conductors 110 or 112.

In the selected Processor, the interruptibility index and the input priority code selected are each directed to the Priority network for comparison. See the above discussion with regard to FIGURE 3. Each of the Processors provide an accept signal on an associated accept line when the criterion is met that its interruptibility index (II$j$) is less than the input priority (IP$i$) selected. Processor 1 is coupled to Accept Gates 108 via conductor 114, Processor 2 is coupled to Accept Gates via conductor 116, and Processor $n$ is coupled to Accept Gates 108 via conductor 118. When it is determined that the selected interruptibility index is equal to or greater than the input priority code, the selected processor rejects the interrupt condition by providing a signal to the Timing and Control 74. The reject line for Processor 1 is labeled 120, the line for Processor 2 is labeled 122, and for Processor $n$ is labeled 124. Timing and Control 74 operate to re-scan the Processors and Input/Output Controllers in response to a rejected interrupt. It is pointed out that no interrupt conditions are lost, however, since the Input/Output Controllers operate to store status words in the Interrupt Buffer List 14 for later processing. Each I/OC is assigned its own buffer area in Memory System 10. For this embodiment sixteen lists, labeled 0–15, with one for each interrupt priority level, are shown for each of the Input/Output Controllers. This merely illustrates that the range of interrupt priority codes may vary from the four levels shown in FIGURE 2. A status word is generated by the circuitry internal to the Input/Output Controller and identifies the nature of the interrupting entity and provides the information necessary for the Processor to select and perform the appropriate task based on such status words. The status word is stored in the appropriate list, according to the input priority code (IP) of the request, in the appropriate buffer which is related to the interrupting I/OC. The status word is always stored, and should there be several interrupt requests with the same IP code from the same Input/Output Controller, the status words are queued in the appropriate list.

*Logic description*

FIGURES 4$a$ through 4$g$ illustrate the logic circuit types utilized in a description of ths embodiment, and the respectively associated truth tables. These circuits are well-known and are commercially available. Accordingly, they will not be described in detail, since this would not add to an understanding of the subject invention. It is of course understood that other types of logic configurations could be utilized in implementing the subject invention, but those shown herein have been found to be advantageous both with regard to expense and circuit operational rates.

FIGURE 5$a$ and FIGURE 5$b$, when laid out according to the plan of FIGURE 5$c$, illustrates the Processor selection portion of the Interrupt Directory. Those portions of the circuitry which are readily relatable to the system diagram of FIGURE 1 will bear the same reference numerals. The Processor Select Sequencer, shown enclosed in dashed block 76, performs the operations of initializing the circuitry, sequentially enabling the testing of the II codes, and enabling the ultimate selection of the appropriate Processor. A ring counter, shown comprised of Stage-T0, Stage-T1, Stage-T2, Stage-T$n$, and Stage-T$n$+1, is utilized for sequentially providing an enable signal on the "1" output terminals of each stage. A ring counter which could be utilized to perform this function is described in detail in copending patent application Ser. No. 466,965, now Patent No. 3,384,761, filed June 25, 1965, and assigned to the assignee of this invention. It is only necessary to note that an active output signal is presented on only one of the output lines, and that as advance pulses are received on advance line 150, the ring counter operates to shift the active state to the next sequential stage and to automatically clear the previously set stage. Timing Control 74 includes a source of regularly occurring pulses and timing circuitry (not shown) which is utilized upon starting a test cycle to issue a pulse on the Initialize line 152 for setting the counter into an ilitial state, and for subsequently issuing advance pulses on line 150 for causing the active state of the ring counter to be transferred from stage to stage. Pulse generation of this type is well-known in the art, and it is not felt necessary to describe this circuitry in detail since repetition rates, polarities, and pulse shape will vary depending upon the circuitry utilized to implement the subject invention. Timing and Control 74 also operate to provide control pulses to the scan control via line 154. The scan control will be described in more detail below. The II storage portion of the DSC register for each of the Processors is shown as three flip-flops. In the remainder of this discussion, the letters CBA are utilized to represent the digits of an interruptibility index code (II) and the letters FED are utilized to designate the respective digits of an interrupt priority code (IP). Each of the II codes is directed to a respectively associated set of test gates. II1 is directed to test gates, shown enclosed in dashed block 160, via cable 62; II2 is directed to test gates, shown enclosed in dashed block 162, via cable 64; and II$n$ is directed to test gates, shown enclosed in dashed block 164, via cable 66. The Test 1 line is coupled to each of the test gates 160; the Test 2 line is coupled to each of the test gates 162, and the Test $n$ line is coupled to each of the test gates 164. The test lines are sequentially activated by the ring counter stages and operate to sequentially gate the II codes into the evaluation circuiry. Each of the A digits are directed to AND circuit 166, each of the B digits are drected to AND circuit 168, and the C digits are directed to AND circuit 170. The logic arrangement is such that the output signals from AND circuits 166, 168, and 170 are the one's complement of the gated-in digits of the respective II codes. For instance, if II1 equals $100_2$, the output signal from A170 will be a "0" and the output sginals from AND circuits 168 and 166 will be 1's, when Test 1 signal is applied to test gates 160. Shown enclosed in dashed block 172 is the test register, referred to hereinafter as the T register. The T register is comprised of three flip-flops designated FF–TA, FF–TB, and FF–TC. It is the function of the T register to maintain the status of the testing sequence. The T register is initialized by seting each FF to the 1 state. This is accomplished during the time when Stage-T0 is providing an active signal on the Initialize line 174. This active signal is a 0 applied to the set terminals of each of the T register flip-flop (see FIGURE 4$f$). The T register 172 at all times after initialization indicates the lowest detected II code and is utilized for comparison with all subsequent II codes. When it is determined that a new II code is of a magnitude less than the value presently indicated by the T register, the T register is altered to indicate this newly discovered lower value. When higher valued II codes are detected, the T register remains unaltered. A comparison circuit is shown enclosed in dashed block 176 and is comprised of N circuits 178, 180, 182, 183 and N'184. The output terminal of AND circuit 170 is coupled via wire 186 to one of the input terminals of N circuits 178, 180, and 182; and AND circuit 168 is coupled via wire 188 to N circuits 180 and 182; and AND circuit 166 is coupled via wire 190 to N circuit 182. The 1 output terminal of each of the flip-flops in the T register are coupled to respectively associated input terminals in the comparison circuit 176. FF–TC is coupled via wire 192 to N circuits 178 and 183; FF–TB is coupled via wire 194 to N circuits 180 and 183; and FF–TA is coupled via wire 196 to N circuit 183. The digits of the respectively scanned II codes are directed to I circuits 193, 195, and 197 via wires 186–1, 188–1, and 190–1, respectively. These signals are inverted and applied to gating circuits 198, 200, and 202 for application to the S input terminals of the T register flip-flops. In the comparison circuit 176, N' circuit 184 receives input signals from each of N circuits 178, 180, 182, and 183, and provides an output signal PS on line 204. Operation is such that when the II code is of a magnitude less than that indicated in the T register, a 1 or + signal will be provided on output line 204. The + PS signal is applied to delay circuit D1, labeled 206, which provides a timing signal TP1 at its output terminal 208 after a predetermined time interval. Timing signal TP1 is applied via wire 208 to I circuit 210 which in turn is coupled to the C input terminals of each of the flip-flops in the T register. TP1 is also applied as an input signal to delay circuit D2, labeled 212, and produces a timing pulse TP2 after a predetermined time. TP2 is utilized as a gating signal via wire 214 to N circuits 198, 200 and 202 for gating a new value II code into the T register.

Shown enclosed in dashed block 220 is the Processor Identification Register hereinafter referred to as the P register. The P register is comprised of flip-flops designated as FF–P1, FF–P2, and FF–P*n*, along with the associated input gating circuitry and output gating circuitry. The S input terminal of FF–P1 is driven by N circuit 222, which receives the Test 1 signal and the +PS signal. The S input terminal of FF–P2 is driven by N circuit 224 which receives the +PS signal and the Test 2 enabling signal. Similarly, FF–P*n* has its S input terminal driven by N circuit 226, which receives input signals from the +PS line and the Test *n* gating signal. It will be recalled from above, that the +PS line only carries a positive signal when it is determined that the II code presently being scanned is of a value less than the previously scanned II codes. Accordingly, it is only when the +PS line goes positive that the state of the P register 220 is to be altered. A function of the P register is to identify, according to which stage is set to the one state, the Processor having the lowest II code value at the given time. For example, on the initial scan during the Test 1 period, a +PS signal will be derived for the example where II equals $100_2$, such that a "1" signal will be impressed on the +PS line along with Test 1. This will result in a "0" signal being directed from N circuit 222 to the S input terminal of FF–P1, which will cause it to be set to the "1" state. The remainder of the flip-flops in the P register are not enabled due to the absence of the Test 2 signal and the Test *n* signal, and will not be affected. On a subsequent test, if it is determined that the II code is of a value less than that previously read, N' circuit 184 will provide the +PS signal which, in conjunction with the then active test signal, will cause the respectively associated P register flip-flop to be set. The P register flip-flops are cleared by the operation of the N circuit applied to the respective C input terminals of the P register flip-flops. For example, if FF–P1 has been set to the 1 state, a 1 will be applied to D circuit 228, which will be in turn applied to N circuit 230. The 1 signal provided from D circuit 228 along with the +PS signal and the TP1 signal received when a subsequent II code is found to be of a lower magnitude than previously set, causes a zero signal to be applied to the C input terminal of FF–P1, thereby causing it to be cleared. Each P register stage has a similar operation utilized for maintaining only one flip-flop in the P register set at any given time, thereby indicating the Processor to be selected.

The "1" output terminal of each flip-flop in the P register 220 is directed to a gating N circuit. FF–P1 has its "1" output terminal coupled to N circuit 232, FF–P2 has its "1" output terminal coupled to N circuit 234, and FF–P*n* has its "1" output terminal coupled to N circuit 236. The Select line, which is driven by Stage -T*n*+1 of the ring counter, is coupled to each of the N circuits 232, 234 and 236. This results in operation when the ring counter has counted through stages T1, T2 and T*n* that all of the II codes have been tested and the time period at *Tn*+1 is set aside for gating the interrupt priority codes to the selected Processor. It is readily apparent that only the one of N circuits 232, 234 and 236 which is coupled to a flip-flop having a 1 set therein will be enabled. This operation results in an enable signal being provided on one of the conductors in cable 80 to the selected set of Gates shown enclosed in dashed block 82. A determination of the I/OC code which is provided as an input to all of the Gates 82 via cable 106 and a determination of the IP code provided on cable 98 to all of the Gates 82 will be discussed in a consideration of FIGURE 7. If the example is such that the II2 code has the lowest numerical value during the scan cycle, an active signal will be provided to select Processor 2 via conductor 80–2, and the gates coupled to the second stage of the P register 220 will provide the IP code and the I/OC code via cable 86. The other gate circuits included in group 82 will be deactivated.

Since a II code of 000 indicates the maximum interruptibility of the associated processor, and since no other II codes can be less than 000, provision is made for terminating the test cycle upon the detection of a II code of 000. Referring again to the T register 172, it will be noted that the 0 output terminals are each coupled to N circuit 240. Thus, when each stage of the T register is set to the 0 stage, a "1" signal will be impressed on each input terminal of N circuit 240 when the enable is received from D3 delay circuit 241. This results in a 0 output signal on line 242 which is applied to N' circuit 244 and causes immediate selection. The test cycle is terminated at that point when the same signal is also applied via line 246 to inhibit further activation of advanced pulses for the time necessary to complete the Processor selection.

Having described the processor selection circuitry, attention is directed to FIGURE 6 which is an illustrative example of one test sequence. The first column labeled "Timing" sets forth the test pulse period and the example II code which is evaluated during the associated test period. During the Initialize cycle, the T register 172 is set to all 1's and the P register 220 is set to all 0's. During the Test 1 period II1, which is equal to $100_2$, results in a +PS signal being provided at the output of N' circuit 184. The T register is set to indicate the value $100_2$ and the P register has the P1 stage set to "1". During the Test 2 cycle II2, which has a value of $001_2$ for this example, is evaluated. Upon comparison of II2 to II1 it is found II2 is of a magnitude less than II1. Accordingly, a +PS signal is generated; the T register is set to read $001_2$ and the P2 stage of the P register is set to the "1" state. During the Test *n* cycle the II*n* code of $010_2$ is evaluated. This is a magnitude greater than the $001_2$, which was evaluated during Test 2 cycle. Accordingly, a −PS or "0" signal is generated, the T register is left unaltered, and the P register is left unaltered. Since Test *n* completes the Test cycle, the operation during time *Tn*+1 is to select the appropriate Processor. This is accomplished by gating out the P register as described above. For this example Processor 2 would be selected since stage P2 of the P register was the last stage set to the 1 state.

FIGURE 7*a* and FIGURE 7*b*, when arranged as shown in FIGURE 7*c*, illustrate the Input/Output Controller selection portion of the Interrupt Directory. The function of the Input/Output Controller Selector, shown as block 68 in FIGURE 1, is basically the inverse of that of the Processor Selector 60. That is, whereas the Processor Selector selects the lowest numerical II code during a scan cycle, the Input/Output Controller Selector 68 selects the highest numerical value IP code. The system and circuitry operation for performing the I/OC selection is very similar to that of the Processor Selector.

The Input/Output Scan Control, shown enclosed in dashed block 92, is controlled by the Timing Control 74 by pulses received on the Initialize line 152 and on the Advance line 154. The Input/Output Scan Control utilizes a ring counter circuit similar to that described above, and is illustrated as blocks labeled Stage-SO, Stage-S1, Stage-S2, Stage-S*m* and Stage-S*m*+1. Again, only one stage is in the active state at any given time, with all other one output terminals beings inactive. The Input/Output Controller Selector, shown enclosed in dashed block 68 on FIGURE 7*b*, is fed directly from the Input/Output Controllers attached in the system. In the embodiment shown, there are two Input/Output Controllers supplying their respective IP codes to the Input/Output Controller Selector 68. The I/OC's each contain a three stage register for storing the IP codes. I/OC 1 has flip-flops shown as FF–F1, FF–E1, and FF–D1. These flip-flops are coupled via cable 70 to a set of scan gates shown enclosed in dashed block 250. In a similar manner, I/OC 2 has flip-flops designated as FF–F2, FF–E2, and FF–D2 coupled via cable 72 to a set of scan gates shown enclosed in dashed block 252. The Scan 1 enable line is coupled to each of the scan gates 250, and a Scan 2 line is coupled to each of the scan gates 252. Similarly arranged output terminals of the scan gates 250 and 252 are coupled respectively to N circuits 254–F, 256–E, and 258–D.

The IP*i* register is shown enclosed in dashed block 96, and is comprised of flip-flops designated FF–D*i*, FF–E*i*, and FF–F*i*, and receive input signals on the S input terminals from N circuits 260, 262, and 264 respectively. The C input terminals of each of the IP*i* register flip-flops are coupled to AND circuit 266 which receives one of its inputs on the Scan Reset line from the Input/Output Scan Control 92. The operation of the Scan Reset signal, when activated, is to provide a zero input signal to A circuit 266, which causes a zero signal to be impressed on the C input terminals of the IP*i* register flip-flops, thereby clearing the IP*i* register. It is the function of the IP*i* register 96 to store the highest valued IP code which has been read at any given instant during a scan cycle. N circuit 260 is coupled to the output terminal of N' circuit 258–D via conductor 268. N circuit 262 has one of its input terminals coupled to the output terminal of N' circuit 256–E via conductor 270. N circuit 264 has one of its input terminals coupled to the output terminal of N' circuit 254–F via conductor 272.

A comparison circuit is shown enclosed in dashed block 274 and is comprised of N circuits 276, 278, 280, and N' 282. The "0" output terminal of FF–F*i* is coupled via conductor 284 to one of the input terminals of each of N circuits 276, 278, and 280. The "0" output terminal of FF–E*i* is coupled via conductor 286 to one of the input terminals of N circuits 276 and 278. The "0" output terminal of FF–D*i* is coupled via conductor 288 to one of the input terminals of N circuit 276. The output terminal of N' circuit 258–D is coupled via conductor 268–1 to another of the input terminals of N circuit 276. The output terminal of N' circuit 256–E is coupled via conductor 270–1 to another of the input terminals of N circuit 278. The output terminal of N' circuit 254–F is coupled via conductor 272–1 to the other input terminal of N circuit 280. N' circuit 282 receives input signals from the output terminal of each of N circuits 276, 278, and 280 for providing a signal on conductor 290 which is indicative of the comparison of the IP code gated into the Input/Output Controller Selector 68 from the I/OC and the value previously indicated in the IP*i* register 96. It will of course be apparent that on the initial comparison, the IP*i* register having been set to zero, that any IP code other than zero read from the I/OC being scanned will be set into the IP*i* register for comparison with future IP codes. It is to be noted that the output signal from N' circuit 282 on conductor 290 will be positive for only those conditions when the IP code which is being scanned is of a magnitude greater than the IP code stored in the IP*i* register 96. This positive signal is applied to delay circuit 292 which provides after a predetermined length of time timing signal plus TC1 on conductor 294. This timing signal is applied via conductor 294–1 to I circuit 296 from where it is directed to AND circuit 266 for ultimately causing the IP*i* register to be cleared in preparation for storing the new indication of a higher IP code. Timing pulse TC1 is also applied to delay circuit 298 which is utilized for providing a second timing pulse plus TC2 after a predetermined time interval on conductor 300. Timing pulse +TC2 is applied via conductor 300–1 to gate N circuits 260, 262, and 264 for causing the new higher valued IP code to be stored in the IP*i* register 96.

It will be recalled for the one-of-three IP coding system that a code of $100_2$ is the maximum interrupt priority. Accordingly, when such a code is read it is not necessary to evaluate further IP codes since none can exceed this value. To accommodate this situation and to save computation time, circuitry is provided for causing the scan cycle to be terminated upon the occurrence of reading a maximum IP code of $100_2$. This is accomplished by coupling the "1" output terminal of FF–F*i* via conductor 302 to I circuit 304 from whence it is directed via conductor 306 as an input to the I/OC Selected N' circuit 308. The I/OC Selected line is directed to all Processor Priority selectors (see FIGURE 8) and operates to advise the Processors to expect a processor select signal from the Processor Selector 60 as described in conjunction with FIGURE 5. The I/OC Selected line will be activated under either condition that (1) the scan cycle has been completed, or (2) that an IP code of a maximum value has been detected. The selection signal applied on conductor 306 is applied to each of the scan gates and operates to deactivate the scan circuits in the Input/Output Scan Control 92.

The "1" output terminal of each stage of the IP*i* register 96 is coupled via cable 98 to the select gates 82 (illustrated in FIGURES 5*a* and 5*b*).

Shown enclosed in dashed block 104 is the Input/Output Controller Encoder. The embodiment illustrated is capable of handling 16 I/OC units for converting a one-of-sixteen code into a straight four-bit numerical code. Shown enclosed in dashed block 310 are the I/O scan signals combinations possible. The open ended signal lines are illustrated for showing the capability of the Input/Output Controller Encoder 104 of handling more than the three scan periods illustrated. It will be noted that Scan 1 line is coupled to N' circuit 312, the Scan 2 line is coupled to N' circuit 314, and the Scan *m* is coupled to N' circuits 316, 318, 320, and 322. Shown enclosed in dashed block 324 are the gating circuits for driving the flip-flop output circuits which are designated FF–01, FF–02, FF–03, and FF–04. It will be noted that the gating circuits 324 are coupled to the S input terminals of these flip-flops. The C input terminals of the output flip-flops are driven by a signal received on conductor 294–2 which carries the +TC1 pulse and operates to clear the output flip-flops for each condition when an IP code is detected to be greater than a previously selected IP code, thus causing these flip-flops to be cleared. Subsequent to the clearing of the output flip-flops, the +TC2 pulse is applied to the gating circuits 324 via conductor 300–2 and operates to gate the new code into the output flip-flops. The "1" output terminal of each of the output flip-flops are coupled into cable 106 which is directed to the select gates 82 illustrated in FIGURE 5*a*.

"The I/OC Identification Register operates to identify the I/OC selected, in a manner similar to that of the Processor Identification Register."

Having described the Processor selection and the Input/Output Controller selection circuitry above, attention will be directed to the Processor Priority network illustrated in FIGURE 8. It is the function of the Processor Prioriity network in each of the Processors to perform the comparision of the present interruptibility index code for the Processor against the interrupt priority code received from the Interrupt Directory (see Figure 3). It will be recalled from the consideration of FIGURE 1 that each Processor has a DSC register which includes a portion for storing the Processor's II code and another portion for storing the IP code received from the Interrupt Directory. In FIGURE 8 the II code storage portion is shown enclosed in dashed block 350 and the IP code storage is shown enclosed in dashed block 352. The II code storage portion of the DSC register is comprised of three flip-flops designated FF–A*j*, FF–B*j*, and FF–C*j*. The IP storage portion is comprised of three flip-flops which are designated as FF–D*i*, FF–E*i*, FF–F*i*. In this consideration "*j*" refers to the Processor selected from the one-of-*n* Processors, and "*i*" refers to the Input/Output Controller selected from the one-of-*m* of available I/OC's.

The II$j$ flip-flops 350 are continually updated by the Processor as the task execution changes. This is a function separate and apart from the subject invention and will not be described in detail. The IP$i$ portion of the DSC register is set by the activation of the appropriate gates 82 in FIGURES 5$a$ and 5$b$. The Processor $j$ selected is notified by the Interrupt Directory impressing an active signal on the I/OC selected line (see FIGURE 7$a$) and an active signal on the select line 80–$j$ which are directed to AND circuit 354. It will be noted that the I/OC Selected signal is directed to all Processors connected to the Interrupt Directory, but that only the $j$ selected Processor receives the additional signal to its control gate 354. A comparison circuit is shown enclosed within dashed block 356. This comparison circuit is comprised of AND circuits 358, 360, 362, and 363, and OR circuit 364. The output terminals of each of these AND circuits are coupled to respective ones of the input terminals of OR circuitry 364. The gating control signal provided by AND circuit 354 is directed via wire 366–1 to an input terminal of each of AND circuits 358, 360, 362, and 363. The "0" output terminal of FF–C$j$ is coupled via wire 368 to an input terminal of each of AND circuits 358, 360, 362, and 363. The "0" output terminal of FF–B$j$ is coupled via wire 370 to the input terminals of AND circuits 358, 360, and 363. The "0" output terminal of FF–A$j$ is coupled via wire 372 to one of the input terminals of AND circuits 358 and 363. The "1" terminal of FF–F$i$ is coupled via wire 374 to one of the input terminals of AND circuit 362. A "1" output terminal of FF–E$i$ is coupled via wire 376 to AND circuit 360. The "1" output terminal of FF–D$i$ is coupled via wire 378 to AND circuit 358. The "0" output terminals of each of the flip-flops in the IP$i$ portion 352 of the DSC register are coupled via wires 380, 382, and 384 to input terminals of AND circuit 363. It is the function of AND circuits 358, 360 and 362 to perform the comparison of II$j$ to IP$i$ for the conditions where IP$i$ is greater than zero. For these conditions the system operation is such that the Processor will only accept an interrupt when its II$j$ code is less than the IP$i$ code. There is one exception to this general system, and that is when the Processor's II code is $000_2$, indicating that it is idle, and a low priority interrupt is being processed having an IP code if 000. The normal path through the comparison circuit would cause an idle Processor to reject this minimum priority interruption. This rejection of course is not desired since the Processor is idle. To alleviate this problem, a comparison is made in AND circuit 363 for a zero setting in II$j$ and a zero setting in IP$i$. When such is found to exist AND circuit 363 will be satisfied, since its inputs are directed to the zero output terminals of each of the flip-flops, and an accept signal will be generated. It should be pointed out at this time that the special case of an IP code of $000_2$ may not be desired as an interrupting condition. Such a situation could result if system operation was desired wherein certain specified tasks would place a status word in the appropriate Table in Memory System 10, but would not interrupt even an idle Processor. Such tasks would not be lost in the system, but would merely be activated by the Executive program within a Processor. To achieve this mode of operation it is necessary only to remove AND 363 from each of the Processor Priority networks. Removal of AND 363 would result in no interruption signal being generated no matter what the II$j$ code when $IPi=000_2$. The output terminal of OR circuit 364 is coupled via wire 390 to I circuit 392. When an accept condition is found to exist, that is II$j$ is less than IP$i$ or $IIj=IPi=0$. an output signal of one will be provided on wire 390 and will be inverted by I circuit 392 forming a zero signal at output terminal 394. N' circuits 396 and 398 are a part of Accept Gates 108. It will be recalled from FIGURE 1 that the Accept Gates are respectively activated by signals from the Input/Output Controller Selector 68. These activation signals indicate which of the I/OC units have been selected. Accordingly, these activation signals are applied from I/OC 1 via wire 100–1 to N' circuit 396, and from I/OC 2 via wire 102–1 to N' circuit 398. Thus, when a zero accept signal is present and when the activation signal is present, either N' circuit 396 or 398 will provide an acknowledge signal on line 110 or 112 respectively. These acknowledge signals advise the I/OC selected that it can remove its statisizing lockout and present additional IP codes to the Interrupt Directory for evaluation. This also indicates that the interrupt has been accepted and will be processed by a selected Processor $j$. The output signal from I circuit 392 is also directed via wire 394-1 to AND circuit 400. Gating circuit 354 provides a signal via wire 366–2 to delay circuit 402. In those cases where a Processor is selected, a signal will be provides a signal via wire 366–2 to delay circuit 402. In those AND circuit 400. These signals combine to indicate that the interrupt is being rejected under the conditions that the Processor has been selected, and it is determined by the signal on line 394–1 that the predetermined requirements for interruption have not been met. When these conditions exist, AND circuit 400 provides a reject signal on line 406 to Timing and Control 74 which causes it to initiate a new scan and test cycle. Timing and Control 74 has timing built therein for reactivating the scan cycle on an accept sequence after enough time has been allowed for the signals to propagate through the accept circuitry and for the appropriate I/OC to be notified that it has been accepted.

*Summary*

The multiprocessor system described above achieves complete Processor anonymity by eliminating any Processor specialization such as arithmetic processing, Input/Output processing, and interrupt handling. By the addition of the Interrupt Directory, which selects Processors for interrupt handling, based on relative values of the interruptibility index codes and the interrupt priority codes in the system, rather than wired connections between specific processors and I/O controllers, a great degree of system freedom and versatility is achieved. It can readily be seen that house-keeping overhead, usually required in the Processor selection operation, is greatly reduced by this Interrupt Directory apparatus. For instance, if a Processor finds that its tasks are completed, by virtue of its task list being depleted, it merely switches to a "mark-time" program and declares itself idle to the system by reducing its interruptibility index to zero. It is not necessary for the Processor to communicate such a change of status directly to the other processors in the system. With regard to Processor program operation, zero program steps are required to determine that the idle processor is the next choice for handling the next interrupt. An additional advantage, is the absence of hard wired-in priority arrangements. The ability to manipulate II codes and IP code values allows flexibility in Processor control without requiring a high degree of sophistication in the executive routines. Selection of tasks to be performed is governed by program and is dynamically subject to change and need not be tailored to a particular multiprocessor system application. Selection of the Processor for handling interrupts is governed by the Interrupt Directory using program controlled parameters. Further, a task can be guaranteed freedom of interruption by setting the interruptibility index to the maximum value, with assurance that interrupt status words will not be lost during execution of such a critical task and will be saved in the main memory. Further, the multiprocessor system may be gracefully degraded, for instance when a processor becomes inoperative or must be removed from the system for maintenance, by simply setting the interruptibility index code for such processor to a maximum value thereby eliminating it from the interrupting sequences. It can be seen that the stated objectives have been met by the foregoing described apparatus and it is understood that suitable modifications can be made in the structure illustrated by those skilled in the art without departing from the spirit and scope of this invention.

What is desired to be protected by Letters Patent is set forth in the appended claims.

What is claimed is:

1. A data processing system comprising: $n$ independently operable data processors for executing ones of a predetermined set of tasks, each of said processors, including interruptibility index code storage means for storing coded signal grouping indicative of the interruptibility level of the one of said set of tasks being executed; $m$ independently operable control means for controlling predetermined sets of interrupting entities, each of said control means including interrupt priority code storage means for storing coded signal groupings indicative of the highest interrupt priority code for the set of interrupting entities coupled thereto; and interrupt directory means coupled to said $n$ processors and to said $m$ control means for macthing the one of said $m$ control means exhibiting the highest interrupt priority code to the selected one of said $n$ processors exhibiting the lowest interruptibility index code.

2. A data processing system as in claim 1 and further including priority comparison means for comparing the interruptibility index of said selected Processor to the matched one of said interrupt priority codes, said priority comparison means including interrupt directory signalling means for providing a first signal when said selected interruptibility index code exhibits a first predetermined relationship to said matched interrupt priority code, and for providing a second signal when said selected interruptibility index code exhibits a second predetermined relationship to said matched interrupt priority code.

3. A data processing system as in claim 2 wherein said interrupt directory means includes processor signalling means for transmitting processor-selection signals to the one of said $n$ processors selected.

4. A data processing system as in claim 3 wherein each of said $n$ processors includes one of said priority comparison means coupled to said processor signalling means.

5. A data processing system as in claim 1 wherein said interrupt directory means comprises: first receiving means for receiving a plurality of interruptibility index codes, each of said interruptibility index codes comprised of signal groupings respectively indicative of the degree of interruptibility of its associated one of said $n$ processors; processor selection means coupled to said first receiving means for selecting one of said interruptibility index codes having a perdetermined relationship with the other of said interruptibility index codes, including first processor signalling means for providing processor selection control signals indicative of the one of said $n$ processors selected for interruption according to said interruptibility index codes; second receiving means for receiving a plurality of interrupt priority codes, each of said interrupt priority codes comprised of signal groupings respectively indicative of the degree of interrupt priority for an associated one of said $m$ control means; and control-means selection means coupled to said second receiving means for selecting one of said interrupt priority codes having a predetermined relationship with the other of said interrupt priority codes, including second processor signalling means for providing control-means selection control signals indicative of the one of said $m$ control means selected.

6. A data processing system as in claim 5 and further including priority comparison means for comparing the interruptibility index of said selected Processor to the matched one of said interrupt priority codes, said comparison means including interrupt directory signalling means for providing a first signal when said selected interruptibility index code exhibits a first predetermined relationship to said matched interrupt priority code, and for providing a second signal when said selected interruptibility index code exhibits a second predetermined relationship to said matched interrupt priority code.

7. A multiprocessor data processing system as in claim 5 wherein said processor selection means includes processor select sequencer means for providing test enable signals in a predetermined order; interruptibility index code comparison means coupled to said processor select sequencer for comparing said interruptibility index codes received from said first receiving means in a predetermined order determined by said test enable signal, said interruptibility index code comparison means including means for providing a processor identification signal indicative of the one of said $n$ processors selected as a result of said comparisons; processor selection storage means coupled to said interruptibility index code comparison means for at least temporarily storing said processor identification signals, said first processor signalling means coupled to said processor selection storage means for providing said processor selection control signals.

8. A multiprocessor data processing system as in claim 7 and further including test sequence control means coupled to said interruptibility index code comparison means for providing a test sequence termination signal when a tested one of said interruptibility index codes is of a predetermined value, said test sequence control means having an output circuit coupled to said first processor signalling means for causing said processor selection control signals to be provided in response to said test sequence termination signal.

9. A multiprocessor data processing system as in claim 5 wherein said control-means selection means includes scan sequencer means for providing scan enable signals in a predetermined order; interrupt priority code comparison means coupled to said scan sequencer means for comparing said interrupt priority codes received from said second receiving means in a predetermined order determined by said scan enable signals, said interrupt priority code comparison means including means for providing control-means identification signals indicative of the one of said $m$ control means selected as a result of said comparison; storage means coupled to said interrupt priority code comparison means for at least temporarily storing said control means identification signals, said second-processor signalling means coupled to said storage means for providing said control-means selection control signals.

10. A multiprocessor data processing system as in claim 9 and further including scan sequence control means coupled to said interrupt priority code comparison means for providing a scan sequence termination signal when a scanned one of said interrupt priority codes is of a predetermined value, said scan sequence control means having an output circuit coupled to said second processor signalling means for causing said control-means selection control signals to be provided in response to said scan sequence termination signal.

11. An Interrupt Directory for use in a multiprocessor data processing system including a plurality of independently operable processor units for executing ones of a predetermined set of tasks, each of said processors including a status register for storing status coded signal groupings indicative of the interruptibility level of the one of said tasks being executed, said status register being programmably alterable for providing a dynamic interruptibility level depending on the task being performed; and processor interrupt selection means coupled to said processors for scanning said status registers, said selection means including means for selecting one of the processors for interruption when said interruptibility index codes for said processors have a predetermined relationship.

12. A data processing system as in claim 11 wherein said processor interrupt selection means includes processor signalling means for transmitting processor-selection signals to the one of said processors selected.

13. For use in a multiprocessor data processing system having a plurality of processors capable of operating independently, each having dynamically alterable designated degrees of interruptibility and a plurality of interrupting entities each having designated degree of interrupt priority, an interrupt directory system comprising: first receiving means for receiving a plurality of interruptibility index codes, each of said interruptibility index codes comprised of signal groupings respectively indicative of the degree of interruptibility of its associated processor; processor selection means coupled to said first receiving means for selecting one of said interruptibility index codes having a predetermined relationship with the other of said interruptibility index codes, including first processor signalling means for providing processor selection control signals indicative of the processor selected for interruption according to said interruptibility index codes; second receiving means for receiving a plurality of interrupt priority codes, each of said interrupt priority codes comprised of signal groupings respectively indicative of the degree of interrupt priority of an associated interrupting entity; and interrupt entity selection means coupled to said second receiving means for selecting one of said interrupt priority codes having a predetermined relationship with the other of said interrupt priority codes, including second processor signalling means for providing interrupt entity selection control signals indicative of the interrupt priority code selected.

14. A multiprocessor data processing system as in claim 13 wherein said processor selection means includes processor select sequencer means for providing test enable signals in a predetermined order; interruptibility index code comparison means coupled to said processor select sequencer for comparing said interruptibility index codes received from said first receiving means in a predetermined order determined by said test enable signal, said interruptibility index code comparison means including means for providing processor identification signals indicative of the one of said *n* processors selected as a result of said comparisons; processor selection storage means coupled to said interruptibility index code comparison means for at least temporarily storing said processor identification signals, said first processor signalling means coupled to said processor selection storage means for providing said processor selection control signals.

15. A multiprocessor data processing system as in claim 14 and further including processor selection sequence termination control means coupled to said interruptibility index code comparison means for providing a test sequence termination signal when a tested one of said interruptibility index codes is of a predetermined value, said processor selection sequence termination control means having an output circuit coupled to said first processor signalling means for causing said processor selection control signals to be provided in response to said test sequence termination signal.

16. A multiprocessor data processing system as in claim 13 wherein said interrupt entity selection means includes scan sequencer means for providing scan enable signals in a predetermined order; interrupt priority code comparison means coupled to said scan sequencer means for comparing said interrupt priority codes received from said second receiving means in a predetermined order determined by said scan enable signals, said interrupt priority code comparison means including means for providing interrupt entity identification signals indicative of the one of said interrupt entities selected as a result of said comparison; interrupt entity selection storage means coupled to said interrupt priority code comparison means for at least temporarily storing said interrupt entity identification signals, said second processor signalling means coupled to said interrupt entity selection storage means for providing said interrupt entity selection control signals.

17. A multiprocessor data processing system as in claim 16 and further including scan sequence termination control means coupled to said interrupt priority code comparison means for providing a scan sequence termination signal when a scanned one of said interrupt priority codes is of a predetermined value, said scan sequence termination control means having an output circuit coupled to said second processor signalling means for causing said interrupt entity selection control signals to be provided in response to said scan sequence termination signal.

References Cited

UNITED STATES PATENTS

| | | | |
|---|---|---|---|
| 3,048,332 | 8/1962 | Brooks et al. | 340—172.5 |
| 3,200,380 | 8/1965 | MacDonald et al. | 340—172.5 |
| 3,308,443 | 3/1967 | Couleur et al. | 340—172.5 |
| 3,331,055 | 7/1967 | Betz et al. | 340—172.5 |
| 3,333,252 | 7/1967 | Shimabukuro | 340—172.5 |

PAUL J. HENON, *Primary Examiner.*

PAUL R. WOODS, *Assistant Examiner.*